US012682155B2

(12) United States Patent
Khosravi Bachehmir et al.

(10) Patent No.: US 12,682,155 B2
(45) Date of Patent: Jul. 14, 2026

(54) SYSTEMS AND METHODS FOR IDENTIFYING A DESIGN TEMPLATE MATCHING A MEDIA ITEM

(71) Applicant: Canva Pty Ltd, Surry Hills (AU)

(72) Inventors: Danial Khosravi Bachehmir, Sydney (AU); Ekaterina Gasparian, St Ives (AU); Reuben Lloyd Van Ammers, Melbourne (AU)

(73) Assignee: Canva Pty Ltd, Surry Hills (AU)

( * ) Notice: Subject to any disclaimer, the term of this patent is extended or adjusted under 35 U.S.C. 154(b) by 176 days.

(21) Appl. No.: 18/599,547

(22) Filed: Mar. 8, 2024

(65) Prior Publication Data

US 2024/0303887 A1 Sep. 12, 2024

(30) Foreign Application Priority Data

Mar. 10, 2023 (AU) ................................. 2023201502

(51) Int. Cl.
*G06T 11/60* (2026.01)
*G06F 16/957* (2019.01)
(52) U.S. Cl.
CPC .......... *G06T 11/60* (2013.01); *G06F 16/9577* (2019.01)
(58) Field of Classification Search
None
See application file for complete search history.

(56) References Cited

U.S. PATENT DOCUMENTS

| | | | |
|---|---|---|---|
| 10,248,994 B2 | 4/2019 | Grosz et al. | |
| 11,290,601 B1 * | 3/2022 | Thorn | H04N 1/00167 |
| 2002/0019833 A1 | 2/2002 | Hanamoto | |

| | | | |
|---|---|---|---|
| 2004/0267715 A1 * | 12/2004 | Polson | G06F 16/40 |
| 2011/0157226 A1 | 6/2011 | Ptucha et al. | |
| 2012/0151341 A1 * | 6/2012 | Ko | G06Q 10/10 |
| | | | 715/867 |
| 2012/0294514 A1 * | 11/2012 | Saunders | G06V 20/30 |
| | | | 382/218 |

(Continued)

FOREIGN PATENT DOCUMENTS

WO 2022268133 A1 12/2022

OTHER PUBLICATIONS

Examination Report No. 1. for Australian Application No. 2023201502 mailed May 22, 2023, pp. 1-7.

(Continued)

*Primary Examiner* — Yanna Wu
(74) *Attorney, Agent, or Firm* — GrowIP Law Group LLC

(57) ABSTRACT

A method for automatically generating one or more digital designs is disclosed. The method includes identifying an input media item; processing the input media item to generate an input media item descriptor; and identifying a first target media item from a set of target media items. Each target media item in the set of target media items is associated with a target media item descriptor and a candidate design template, and the first target media item is identified based on a similarity between the input media item descriptor and the target media item descriptor of the first target media item. The method further includes generating a new digital design. The new digital design being based on the candidate design template associated with the first target media item, and generated to replace the first target media item with the input media item.

20 Claims, 8 Drawing Sheets

100

(56)　　　　　　References Cited

U.S. PATENT DOCUMENTS

| | | |
|---|---|---|
| 2013/0124968 A1 | 5/2013 | Dontcheva et al. |
| 2018/0129634 A1 | 5/2018 | Sivaji et al. |
| 2023/0088925 A1* | 3/2023 | Sharma ............... G06F 18/2431 |
| | | 382/156 |

OTHER PUBLICATIONS

Extended European Search Report for European Application No. 24162693 mailed Jul. 15, 2024, pp. 1-10.

* cited by examiner

400

402 ⌇ Identify potential design templates

For each potential template

404
Target media item analyzed?

Yes                    No

Associate potential template ID with target media item and descriptor in descriptor database ⌇ 406

407 ⌇ Analyse target media item to generate descriptor

408 ⌇ Add new record in descriptor database for target media item and descriptor pair 410 ⌇ Create index

500

502 — Receive request for matching template

504 — Image file received?

No ← | → Yes

506 — Image descriptor exists?

508 — Generate input image descriptor

No →

Yes →

510 — Identify initial set of candidate templates

512 — Identify final set of candidate templates

For each candidate template

514 — Replace candidate template target image with input image

516 — Output updated candidate template(s)

SYSTEMS AND METHODS FOR IDENTIFYING A DESIGN TEMPLATE MATCHING A MEDIA ITEM

CROSS-REFERENCE TO RELATED APPLICATION

This application is a U.S. Non-Provisional Application that claims priority to Australian Patent Application No. 2023201502, filed Mar. 10, 2023, which is hereby incorporated by reference in its entirety.

TECHNICAL FIELD

Aspects of the present disclosure are directed to digital design software applications and more particularly to systems and methods for identifying design templates matching one or more media items.

BACKGROUND

Various computer applications for creating and publishing digital designs exist. Generally speaking, such applications allow users to create a design by, for example, creating one or more pages and adding design elements, such as text, images, audios, videos, etc., to that page.

Often such applications provide a number of design templates in various design categories to aid users in creating designs. Users can select a design template from the available templates and customize it to create their own design, by e.g., customizing or changing one or more of the design elements available in the design template.

However, when a plethora of design templates are available, it may often be difficult for a user to select a particular design template from the almost unlimited choice.

SUMMARY

Described herein is a computer-implemented method for automatically generating one or more digital designs. The method may include identifying an input media item, processing the input media item to generate an input media item descriptor, and identifying a first target media item from a set of target media items. Where each target media items in the set of target media items may be associated with a target media item descriptor and a candidate design template, and the first target media item is identified based on a similarity between the input media item descriptor and the target media item descriptor of the first target media item. The method may further include generating a new digital design, where: the new digital design is based on the candidate design template associated with the first target media item, and the new digital design is generated to replace the first target media item with the input media item.

Also described herein is a computer-implemented method for identifying one or more design templates matching an input media item. The method includes receiving the input media item, the input media item selected by a user, processing the input media item to generate an input media item descriptor, and identifying one or more target media items from a set of target media items. Each target media item in the set of target media items may be associated with a target media item descriptor and a candidate design template, and the one or more target media items may be identified based on a similarity between the input media item descriptor and the target media item descriptors of the one or more target media items. The method may further include identifying candidate design templates associated with the one or more target media items, and causing display of the identified candidate design templates on a display of a user device that selected the input media item.

Further still, disclosed herein a computer readable medium comprising instructions, which when executed by a processing unit of a computer processing system cause the computer processing system to perform any one of the above methods.

Also disclosed herein is a computer processing system including: a processing unit; and a non-transitory computer-readable storage medium storing instructions, which when executed by the processing unit, causes the processing unit to perform any one of the above-described methods.

Figure 1:
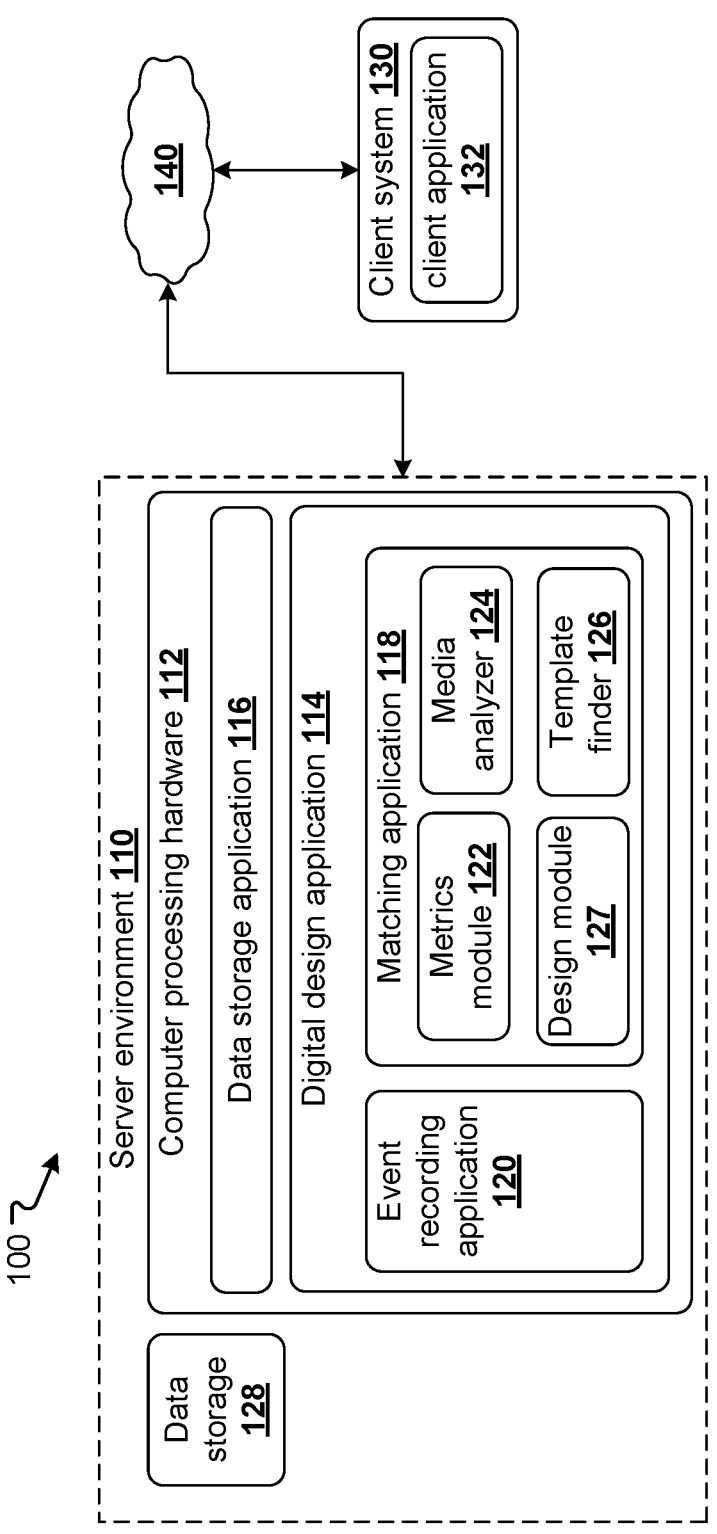
FIG. 1 is a diagram depicting a networked environment in which various features of the present disclosure may be implemented.

While the description is amenable to various modifications and alternative forms, specific embodiments are shown by way of example in the drawings and are described in detail. It should be understood, however, that the drawings and detailed description are not intended to limit the invention to the particular form disclosed. The intention is to cover all modifications, equivalents, and alternatives falling within the scope of the present disclosure as defined by the appended claims.

DETAILED DESCRIPTION

In the following description numerous specific details are set forth in order to provide a thorough understanding of the present disclosure. It will be apparent, however, that embodiments of the present disclosure may be practiced without these specific details. In some instances, well-known structures and devices are shown in block diagram form in order to avoid unnecessary obscuring.

Generally speaking, aspects of the present disclosure are utilized in systems and methods for creating digital designs. In particular, the techniques disclosed herein are described in the context of a computer system that is configured to facilitate the creation of digital designs. By way of example, and generally speaking, the computer system may provide user interfaces that allow a user to create and edit a digital design by adding, deleting, or modifying elements (such as graphics and/or text) in a design template.

As described previously, most digital design computer applications present a plethora of design templates to users in various design categories. The templates may be organized based on one or more design parameters such as design type, theme, colors, occasion, etc. A user may browse these design templates (often by filtering/sorting/searching based on one or more design parameters) until a particular design template is selected for customization.

In case a computer application offers hundreds of thousands of templates, users may find the task of identifying a suitable design template based on conventional search techniques to be challenging. In other cases, users may be comfortable searching, but may not know how to describe the design template they are after in appropriate keywords, and therefore may have to peruse thousands of design templates before they identify the design template they wish to use. In still other cases, users may wish to use an existing design template, but may wish to replace one or more existing media items in that template with their own media item (e.g., image, video, or audio) and may wish to preview the design template with their own selected media item(s) before selecting the design template for further customization.

To aid with one or more of the above-identified issues, aspects of the present disclosure provide systems, methods, and/or computer readable media that are configured to receive an input media item (e.g., image) from a user and identify one or more candidate design templates from a database of design templates that may be suitable for the input media item. In some embodiments, the disclosed systems and/or methods may also replace an existing media item in the identified candidate design templates with the media item provided by the user before returning the candidate design templates to the user.

In order to identify a matching design template, the disclosed systems and methods may utilize a machine learning model that analyzes media items in design templates and assigns descriptors (mathematical or natural language) to each of the analyzed media items. Subsequently, when a media item is received from the user (also referred to as an input media item in this disclosure), the machine learning model analyzes the input media item and assigns a descriptor to the input media item in a similar manner. It may then compare this descriptor with the descriptors of the media items associated with the stored design templates and identify media items that have similar descriptors to the input media item's descriptor. The systems and methods may then retrieve the design templates that use the identified media items and display these on the user device as candidate design templates. In some examples, it may replace the existing identified media items in the candidate design templates with the input media item.

In this way, the presently disclosed systems and methods may provide a small selection of candidate design templates to the user to choose from based on an input media item provided by the user. The user does not need to input any search keywords or provide any further information, but in some embodiments may be able to do so to reduce the set of identified candidate design templates. In case additional information is not provided, the system can itself intelligently and automatically identify candidate templates that the input media item can be used with and serve these to the user. Further, a user may be able to quickly preview the candidate design templates with the input media item—this may further aid the user in selecting the ultimate design template they wish to use and customize.

These and other aspects of the present disclosure will now be described with reference to the following figures.

Network Architecture and System

FIG. 1 is a diagram depicting a networked environment in which various features of the present disclosure may be implemented.

Embodiments of the present disclosure are described with reference to a digital design platform 100 which includes server- and client-side applications which operate together to perform the processing described herein.

The digital design platform 100 includes a server environment 110 and a client system 130 which communicate via one or more communications networks 140 (e.g. the Internet).

Generally speaking, the server environment 110 includes computer processing hardware 112 (discussed below) on which applications that provide server-side functionality to client applications such as client application 132 (described below) execute. In the present example, the server environment 110 includes a digital design application 114 (which may also be referred to as a front end server applications), and a data storage application 116.

The digital design application 114 may execute to provide a client application endpoint that is accessible over the communications network 140. For example, where the digital design application 114 serves web browser client applications the digital design application 114 is hosted by a web server which receives and responds (for example) to HTTP requests. Where the digital design application 114 serves native client applications, the digital design application 114 may be hosted by an application server configured to receive, process, and respond to specifically defined API calls received from those client applications. The server environment 110 may include one or more web server applications and/or one or more application server applications allowing it to interact with both web and native client applications.

Generally speaking, the digital design application 114 facilitates various functions related to creating and editing designs in the digital design platform 100. This may include, for example, creating, editing, storing, searching, retrieving, and/or viewing designs. The digital design application 114 may also facilitate additional functions that are typical of server systems—for example user account creation and management, user authentication, and/or other server side functions. Each of these functionalities may be provided by individual applications, e.g., an account management application (not shown) for account creation and management, a design creation application (not shown) to aid users in creating, editing, storing designs, a management application (not shown) that is configured to maintain and store design templates and media items in the data storage, etc.

In addition to these applications, the digital design application 114 include a matching application 118 and an event recording application 120. The matching application 118 may be configured to receive a matching template request from a client system 130 that includes an input media item and may be configured to serve one or more candidate design templates suitable for the input media item to the client system 130 in response to the matching template request. It may also be configured to replace a target media item in the candidate design template(s) with the input media item. In order to do so, the matching application 118 includes sub-modules or programs. These include—a metrics module 122, a media analyzer 124, a template finder 126, and a design module 127. The metrics module 122 is configured to receive event records and maintain design template usage metrics. The media analyzer 124 is configured to analyze media items and generate descriptors for the media items. The template finder 126 is configured to identify one or more media items that match a given media item based on the corresponding media descriptors and identify candidate design templates associated with the identified matching media items. The design module 127 is configured to receive the input media item and the candidate design templates from the template finder 126 and replace a target media item in one or more of the candidate design templates that has been identified as being similar to the input media item with the input media item to generate new designs. Operations of these modules 122-127 will be described in more detail later.

The event recording application 120 monitors user account interactions with the digital design application 114 and records these user account interactions as event logs or event records. The event recoding application 120 may be configured to communicate the event records to the matching application 118 and in particular the metrics module 122 either as a continuous stream or in batches periodically.

In some cases, the event recording application 120 may be an independent event that is designed based on a publish-subscribe model. That is, the client applications 132 and/or the digital design application 114 send event data to the event platform and consumers (such as the metrics module 122) subscribe to the event platform to receive certain type of event data from the event platform. In this model, the publishers categorize the event data into classes without knowledge of which subscribers there may be. Similarly, subscribers express interest in one or more classes of event data and receive event data from the event platform that is of interest to them. When the event platform receives an event record, the event platform matches the event log with the subscribers who are subscribed to the event and makes a copy of the event data for each subscriber and stores a copy of the subscriber's queue or stream. In this case, the client applications 132 and/or digital design application 114 may submit event records to the event platform and the metrics module 122 may subscribe to the event platform to receive event data related to any user account interaction with design templates hosted by the server environment 110.

The data storage application 116 executes to receive and process requests to persistently store and retrieve data relevant to the operations performed/services provided by the digital design application 114. Such requests may be received from the digital design application 114 and/or (in some instances) directly from client applications such as 132. Data relevant to the operations performed/services provided by the digital design application 114 may include, for example, user account data, user design data (i.e., data describing designs that have been created by users), design template data (e.g., templates that can be used by users to create designs), media item data (e.g. data in respect of stock media items that users may add to designs), and/or other data relevant to the operation of the server environment 110. In addition, the data may include usage metrics (e.g., data indicating how often a design template is selected and/or how often a media item is replaced in a design template), and media item descriptors (e.g., data in respect of the analyzed media items and their associated design templates).

The data storage application 116 may, for example, be a relational database management application or an alternative application for storing and retrieving data from data storage 128. Data storage 128 may be any appropriate data storage device (or set of devices), for example one or more non-transitory computer readable storage devices such as hard disks, solid state drives, tape drives, or alternative computer readable storage devices.

In server environment 110, the digital design application 114 persistently stores data to data storage 128 via the data storage application 116. In alternative implementations, however, the digital design application 114 may be configured to directly interact with data storage devices such as 128 to store and retrieve data (in which case a separate data storage application 116 may not be needed). Furthermore, while a single data storage application 116 is described, server environment 110 may include multiple data storage applications. For example one data storage application 116 may be used for user account data, another for user design data, another for design element data, another for image descriptors and so forth. In this case, each data storage application 116 may interface with one or more shared data storage devices and/or one or more dedicated data storage devices, and each data storage application may receive/respond to requests from various server-side and/or client-side applications (including, for example digital design application 114).

As noted, the digital design application 114 runs on (or are executed by) computer processing hardware 112. Computer processing hardware 112 includes one or more computer processing systems. The precise number and nature of those systems will depend on the architecture of the server environment 110.

For example, in one implementation each digital design application 114 may run on its own dedicated computer processing system. In another implementation, two or more digital design applications 114 may run on a common/shared computer processing system. In a further implementation, server environment 110 is a scalable environment in which application instances (and the computer processing hardware 112—i.e. the specific computer processing systems required to run those instances) are commissioned and decommissioned according to demand—e.g., in a public or private cloud-type system. In this case, server environment 110 may simultaneously run multiple instances of each application (on one or multiple computer processing systems) as required by client demand. Where server environment 110 is a scalable system it includes additional applications to those illustrated and described. As one example, the server environment 110 may include a load balancing application (not shown) which operates to determine demand, direct client traffic to the appropriate design application instance 114 (where multiple design applications 114 have been commissioned), trigger the commissioning of additional server environment applications (and/or computer processing systems to run those applications) if required to meet the current demand, and/or trigger the decommissioning of server environment applications (and computer processing systems) if they are not functioning correctly and/or are not required for current demand.

Communication between the applications and computer processing systems of the server environment 110 may be by any appropriate means, for example direct communication or networked communication over one or more local area networks, wide area networks, and/or public networks (with a secure logical overlay, such as a VPN, if required).

The present disclosure describes various operations that are performed by applications of the server environment 110. Generally speaking, however, operations described as being performed by a particular application (e.g., matching application 118) could be performed by one or more alternative applications, and/or operations described as being performed by multiple separate applications (e.g., design creation application and management application) could in some instances be performed by a single application.

Client system 130 hosts a client application 132 which, when executed by the client system 130, configures the client system 130 to provide client-side functionality/interact with server environment 110 (or, more specifically, the digital design application 114). Via the client application 132, and as discussed in detail below, a user can access the various techniques described herein—e.g., the user can upload or in any other manner provide an input media item and preview, edit, or store one or more candidate design templates with or without the input media item. Client application 132 may also provide a user with access to additional design related operations, such as creating, editing, saving, publishing, sharing, and/or other design related operations.

The client application 132 may be a general web browser application which accesses the digital design application 114 via an appropriate uniform resource locator (URL) and communicates with the digital design application 114 via general world-wide-web protocols (e.g. HTTP, HTTPS, FTP). Alternatively, the client application 132 may be a native application programmed to communicate with digital design application 114 using defined application programming interface (API) calls and responses.

A given client system such as 130 may have more than one client application 132 installed and executing thereon. For example, a client system 130 may have a (or multiple) general web browser application(s) and a native client application.

The present disclosure describes some method steps and/or processing as being performed by the client application 132. In certain embodiments, the functionality described may be natively provided by the client application 132 (e.g. the client application 132 itself has instructions and data which, when executed, cause the client application 132 to perform the described steps or functions). In alternative embodiments, the functionality described herein may be provided by a separate software module (such as an add-on or plug-in) that operates in conjunction with the client application 132 to expand the functionality thereof.

In still further alternative embodiments, the functionality describe herein may be provided by a separate application which communicates with the client application 132 as required—for example to receive data required to perform the processing and communicate the output generated by the processing. The separate application may run on client system 130 or on an alternative computer processing system. As one example, the separate application may be an image processing application or an alternative application running at server environment 110 or at an alternative server environment.

While the embodiments described below make use of a client-server architecture, the techniques and processing described herein could be adapted to be executed in a stand-alone context—e.g. by an application (or set of applications) that run on a computer processing system and can perform all required functionality without need of a server environment or application.

Computer System

As noted, the techniques and operations described herein are performed by one or more computer processing systems.

By way of example, client system 130 may be any computer processing system which is configured (or configurable) by hardware and/or software—e.g. client application 132—to offer client-side functionality. A client system 130 may be a desktop computer, laptop computer, tablet computing device, mobile/smart phone, or other appropriate computer processing system.

Similarly, the applications of server environment 110 are also executed by one or more computer processing systems. Server environment computer processing systems are server systems, though again may be any appropriate computer processing systems.

Figure 2:
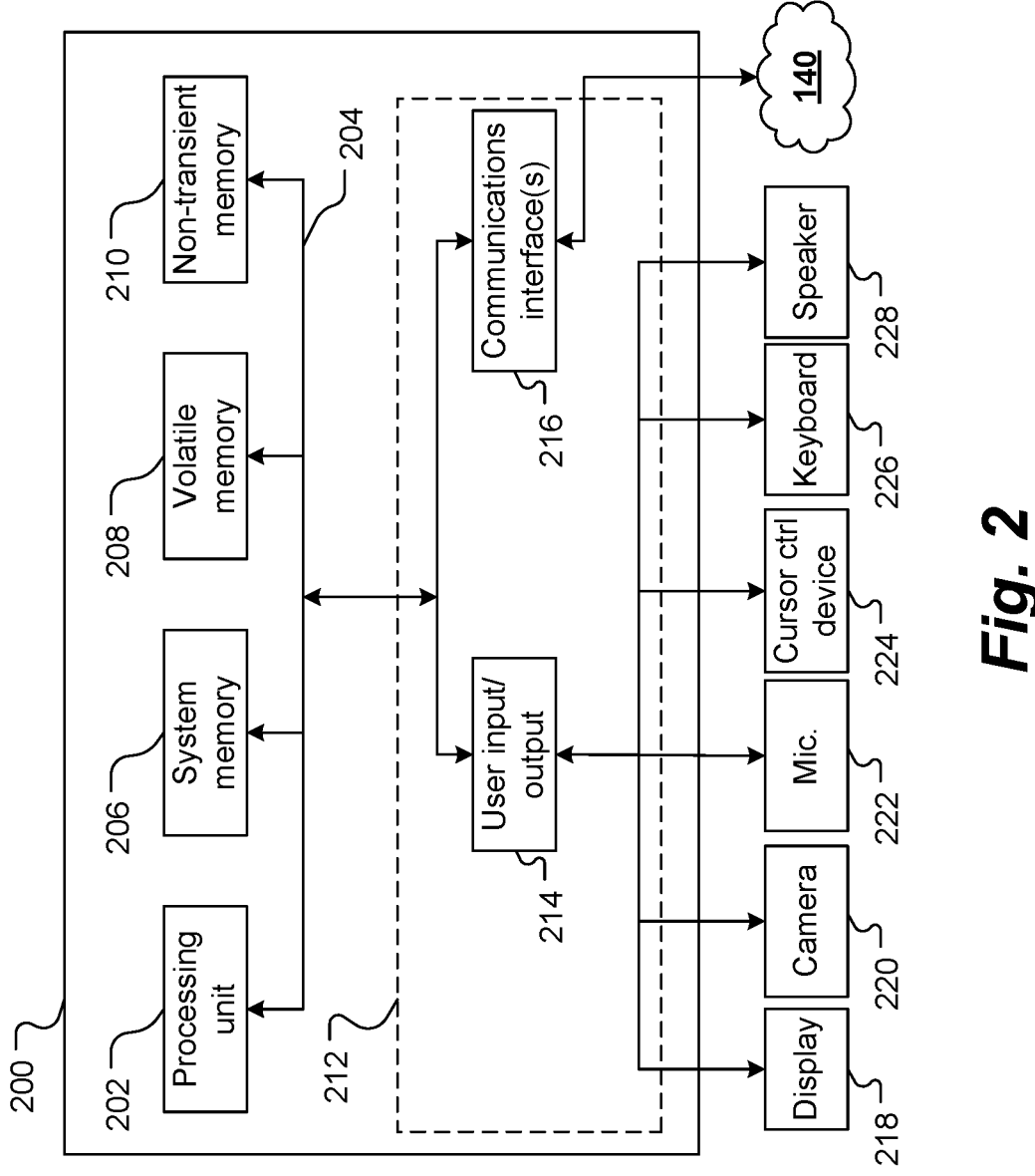
FIG. 2 is a block diagram of a computer processing system configurable to perform various features of the present disclosure.

FIG. 2 provides a block diagram of a computer processing system 200 configurable to implement embodiments and/or features described herein. System 200 is a general purpose computer processing system. It will be appreciated that FIG. 2 does not illustrate all functional or physical components of a computer processing system. For example, no power supply or power supply interface has been depicted, however system 200 either carries a power supply or be configured for connection to a power supply (or both). It will also be appreciated that the particular type of computer processing system determines the appropriate hardware and architecture, and alternative computer processing systems suitable for implementing features of the present disclosure may have additional, alternative, or fewer components than those depicted.

Computer processing system 200 includes at least one processing unit 202. The processing unit 202 may be a single computer processing device (e.g. a central processing unit, graphics processing unit, or other computational device), or may include a plurality of computer processing devices. In some instances, where a computer processing system 200 is described as performing an operation or function all processing required to perform that operation or function is performed by processing unit 202. In other instances, processing required to perform that operation or function may also be performed by remote processing devices accessible to and useable (either in a shared or dedicated manner) by system 200.

Through a communications bus 204 the processing unit 202 is in data communication with a one or more machine readable storage (memory) devices which store computer readable instructions and/or data which are executed by the processing unit 202 to control operation of the processing system 200. In this example system 200 includes a system memory 206 (e.g. a BIOS), volatile memory 208 (e.g. random access memory such as one or more DRAM modules), and non-transitory memory 210 (e.g. one or more hard disk or solid state drives).

System 200 also includes one or more interfaces, indicated generally by 212, via which system 200 interfaces with various devices and/or networks. Generally speaking, other devices may be integral with system 200, or may be separate. Where a device is separate from system 200, connection between the device and system 200 may be via wired or wireless hardware and communication protocols, and may be a direct or an indirect (e.g. networked) connection.

Generally speaking, and depending on the particular system in question, devices to which system 200 connects—whether by wired or wireless means—include one or more input devices to allow data to be input into/received by system 200 and one or more output device to allow data to be output by system 200. Example devices are described below, however it will be appreciated that not all computer processing systems include the mentioned devices, and that additional and alternative devices to those mentioned may well be used.

For example, system 200 may include or connect to one or more input devices by which information/data is input into (received by) system 200. Such input devices may include keyboard, mouse, trackpad, microphone, accelerometer, proximity sensor, GPS, and/or other input devices. System 200 may also include or connect to one or more output devices controlled by system 200 to output information. Such output devices may include devices such as a display (e.g., a LCD, LED, touch screen, or other display device), speaker, vibration module, LEDs/other lights, and/or other output devices. System 200 may also include or connect to devices which may act as both input and output devices, for example memory devices (hard drives, solid state drives, disk drives, and/or other memory devices) which system 200 can read data from and/or write data to, and touch screen displays which can both display (output) data and receive touch signals (input).

By way of example, where system 200 is a client system such as 130 it may include a display 218 (which may be a touch screen display), a camera device 220, a microphone device 222 (which may be integrated with the camera device), a cursor control device 224 (e.g. a mouse, trackpad, or other cursor control device), a keyboard 226, and a speaker device 228.

System 200 also includes one or more communications interfaces 216 for communication with a network, such as network 140 of digital design platform 100 (and/or a local network within the server environment 110). Via the communications interface(s) 216, system 200 can communicate data to and receive data from networked systems and/or devices.

System 200 may be any suitable computer processing system, for example, a server computer system, a desktop computer, a laptop computer, a netbook computer, a tablet computing device, a mobile/smart phone, a personal digital assistant, or an alternative computer processing system.

System 200 stores or has access to computer applications (also referred to as software or programs)—i.e. computer readable instructions and data which, when executed by the processing unit 202, configure system 200 to receive, process, and output data. Instructions and data can be stored on non-transitory computer readable medium such as 210 accessible to system 200. Instructions and data may be transmitted to/received by system 200 via a data signal in a transmission channel enabled (for example) by a wired or wireless network connection over an interface such as communications interface 216.

Typically, one application accessible to system 200 is an operating system application. In addition, system 200 stores or has access to applications which, when executed by the processing unit 202, configure system 200 to perform various computer-implemented processing operations described herein. For example, and referring to the networked environment of FIG. 1 above, server environment 110 includes one or more systems which run a digital design application 114, and a data storage application 116. Similarly, client system 130 runs a client application 132.

In some cases part or all of a given computer-implemented method is performed by system 200 itself, while in other cases processing may be performed by other devices in data communication with system 200.

Data Structures

The following section describes data structures employed by the digital design application 114 to identify design templates suitable for an input media item. The data structures and fields described are provided by way of example. Depending on the implementation, additional, fewer, or alternative fields may be used. Further, the fields described in respect of a given data structure may be stored in one or more alternative data structures (e.g. across multiple linked data structures). Further, although tables are used to illustrate the data structures, the relevant fields/information may be stored in any appropriate format/structure.

Data in respect of design templates and new designs that are being created may be stored in various formats. An example design data format that is used throughout this disclosure will now be described. Alternative design data formats (storing alternative design attributes) are, however, possible, and the processing described herein can be adapted for alternative formats.

In the present context, data in respect of a given design template is stored in a design record. Generally speaking, a design record defines certain design-level attributes and includes page data. The page data includes (or references) one or more page records, each of which defines a page of the design. A design's page data defines (or references) one or more page records. Each page record defines a page of the design via one or more page-level attributes and element data.

In the present example, the format of each design record is a device independent format comprising a set of key-value pairs (e.g. a map or dictionary). To assist with understanding, a partial example of a design record format is as follows:

TABLE A

| Example design record | |
| --- | --- |
| Key/field | Example |
| Design ID | "designId": "abc123", |
| Dimensions | "dimensions": {"width": 1080, "height": 1080}, |
| Design type | "type": ["poster"], |
| Design name | "name": "birthday style 3", |
| Design owner | "owner": 12ab34cd, |
| Edit time | "edited": "xxx" |
| Language | English |
| Pages | "pages": [{page 1}, . . . {page n}] |

In this example, the design-level attributes include: a design identifier (which uniquely identifies the design); page dimensions (e.g., a default page width and height); a design type (e.g., an indicator of the type of the design, which may be used for searching and/or sorting purposes); a design name (e.g., a string defining a default or user specified name for the design); a design owner (e.g., an identifier of a user or group that owns or created the design); a most recent edit time (e.g., a timestamp indicating when the design was last edited); a language of the design, and page data (discussed below). Additional and/or alternative design-level attributes may be provided, such as attributes regarding creation date, design version, design permissions, and/or other design-level attributes.

To assist with understanding, a partial example of a page record format is as follows:

TABLE B

| Example page record | |
| --- | --- |
| Attribute | Example |
| Dimensions | "dimensions": {"width": 1080, "height": 1080} |
| Background | "background": {"assetID": "M12345"} |
| Element data | "elements": [{element 1}, . . . {element n}] |

In this example, the page-level attributes include: dimensions (e.g. a page width and height which, if present, override the default page dimensions defined by the design level dimensions attribute described above); background (data indicating any page background that has been set, for example an asset identifier of an image that has been set as the page background, a value indicating a particular color of a solid background fill, or data indicating an alternative background); and element data (discussed below). Additional and/or alternative page-level attributes may be provided, such as attributes regarding creation date, design version, design permissions, and/or other design-level attributes.

In this example, a design page's element data is a set (in this example an array) of element records. Each element record defines an element (or a set of grouped elements) that has been added to the page. In this example, an element record's position in a page's elements array serves to identify the element and also determines the depth or z-index of the element (or element group) on the page (e.g. an element at array index n is positioned above an element at array index n−1 and below an element at array index n+1). Element depth may be alternatively handled, however, for example, by storing depth as an explicit element attribute.

Generally speaking, an element record defines an object that has been added to a page—e.g. by copying and pasting, importing from one or more asset libraries (e.g. libraries of images, animations, videos, etc.), drawing/creating using one or more design tools (e.g. a text tool, a line tool, a rectangle tool, an ellipse tool, a curve tool, a freehand tool, and/or other design tools), or by otherwise being added to a design page.

Different types of design elements may be provided depending on the system in question. By way of example, design element types such as the following may be provided: image/graphic elements; video elements; audio elements; text elements; and/or elements of other types.

As will be appreciated, different attributes may be relevant to different element types. For example, any element that holds visual media (e.g. an image, video, text, etc) will typically be associated with position and size data, while such data may not be relevant to an element that holds audio media. Accordingly, different element record formats (with different attributes) may be used for different element types.

By way of example, an element record for a graphic type element may be as follows:

In addition to design template records, page records and element records, the server application may also maintain and store usage metric data with respect to usage of the design templates. For example, it may maintain data with respect to the number of times a design template has been viewed, the number of times a design template has been selected, the number of times a design template has been modified, etc. In addition, the matching application 118 and in particular the metrics module 122 may maintain metric data with respect to the media items or design elements in a design template that are modified or replaced.

It will be appreciated that a number of implicit conclusions can be drawn from event data. For example, if a design template is selected more often than other design templates in its category in a short period of time, it can be conclude that the design template is especially popular with users currently. Similarly, if a design template has not been selected in a selected period of time (e.g., last six months), it can be concluded that the design template is either disliked by customers or is not sufficiently visible to customers (e.g., because it appears towards the end of any search for design templates). Similarly, if a particular image in a design template is replaced more often than not, it can be concluded that the particular image may not be suitable for that design template or that the design template almost encourages the replacement of that particular image (e.g., because the design template is a resume template with a generic image or the design template is a wedding invitation with a generic couple image).

Accordingly, usage metrics are maintained so that the usage of design templates can be analysed. The usage metric data may also be utilized in the present disclosure to help identify candidate design templates to recommend to a user in response to an input image.

Table D illustrates example design template usage data. This data indicates popularity of design templates. Each record includes, for example, a design template ID and corresponding counts of the number of times customers have interacted with the design template, along with a timestamp of the latest interaction. In other examples, each record may include the design template identifier and a count of the number of times a design template was used in a published or saved design.

TABLE C

| | Example element record | |
|---|---|---|
| Attribute | Note | E.g. |
| Type | A value defining the type of the element. | "type": "GRAPHIC" |
| Position | Data defining the position of the element: e.g. an (x, y) coordinate pair defining (for example) the top left point of the element. | "position": (100, 100) |
| Size | Data defining the size of the element: e.g. a (width, height) pair. | "size": (500, 400) |
| Rotation | Data defining any rotation of the element. | "rotation": 0 |
| Opacity | Data defining any opacity of the element (or element group). | "opacity": 1 |
| Media item identifier | Data indicating the media item (e.g. an image) that the element holds/is used to display | "MediaItemID": "M12345" |

TABLE D

| Design template identifier | Selection count | Edit count | Publish count | Timestamp (last event) |
|---|---|---|---|---|
| 2352 | 10 | 8 | 5 | 13/02/2023 18:13PM |
| 2353 | 12 | 3 | 2 | 13/02/2023 16:43PM |
| 7364 | 3 | 1 | 1 | 11/02/2023 10:23 AM |
| 8236 | 32 | 12 | 7 | 6/02/2023 7:55 AM |
| . . . | . . . | . . . | . . . | |

In some examples, table D may store records if the timestamp is before a threshold/cutoff date (e.g., less than 6 months old). If any record in the table is older than the threshold date, it may be deleted. This way table D maintain up to date or current usage data.

In some examples, table D may be created and updated periodically. In other examples, table D may be created from event data when needed—e.g., when executing method 400 or 500.

Table E illustrates another example usage metric stored in data storage 128. This usage data indicates how often a given media item is replaced in a given design template and includes a media item ID of the media item that is replaced, a design template identifier of the design template in which the media item was replaced, and a count of the number of times that media item was replaced in that design template.

TABLE E

| Media Item ID | Design template ID | # replaced |
|---|---|---|
| 26713578 | 2352 | 15 |
| 28937274 | 2353 | 22 |
| 72674982 | 7364 | 11 |
| 87234629 | 8236 | 78 |
| . . . | . . . | . . . |

It will be appreciated that these are two examples of usage data that may be maintained in data storage 128. In other implementations other usage data may also be maintained by the metrics module without departing from the scope of the present disclosure.

Finally, the design application 114 may also store media item descriptors for the media items that have been analyzed by the media analyzer 124. In one example, the descriptors data may be stored along with the identifier(s) of the design template(s) in which the corresponding media item. Depending on the type of analyzer utilized, the format of the descriptors may vary. In some examples, the descriptors may be a mathematical value (e.g., a list of numbers, vectors, etc.) representing the position of the image in a vector space. An example may be a vector embedding such as {0.6, 0.3, 0.1} for an input image. In other examples, the descriptors may be natural language captions describing the media item, e.g., 'a pencil drawing of a banana'.

Table F below shows an example data structure storing media item descriptors. As shown in the table, each records may include a media item ID of the media item that has been analyzed (also referred to as a target media item in this disclosure), a design template in which the media item was found, and the media item descriptor. In some examples, e.g., where the media analyzer 124 analyzes a subset of the media items based on one or more conditions (e.g., it analyzes media items that are frequently replaced in design templates), the record may include a subset of the design templates in which the media item is used (e.g., the design templates in which the media item has been replaced frequently). In other examples, where the media analyzer 124 analyzes all media items hosted by the design platform 100 or analyzes media items based on other conditions, a record in table F may include the entire set of design templates in which a corresponding media item is used.

TABLE F

| Media item ID | Design template ID | Asset Descriptor |
|---|---|---|
| 26713578 | 2352 | 0.6, 0.3, 0.1 |
| 28937274 | 2353, 8234 | 0.8, 0.5, 0.3 |
| 72674982 | 7364 | 0.4, 0.5, 0.9 |
| 87234629 | 8236 | 0.4, 0.2, 0.3 |
| . . . | . . . | . . . |

The storage location for the data described above depends on implementation. For example, in the design platform 100 described above the design records, metric data and media item descriptors data may be (ultimately) stored in/retrieved from the server environment's data storage 128. This may involve the client application 132, metric module 122, and media analyzer 124 communicating data to the server environment 110—for example to the design application 114 which stores the data in data storage 128. Alternatively, or in addition, some of the above-described data (e.g., the design data) may be locally stored on a client system 130 (e.g. in non-transitory memory 210 thereof).

Example Methods

Figure 6:
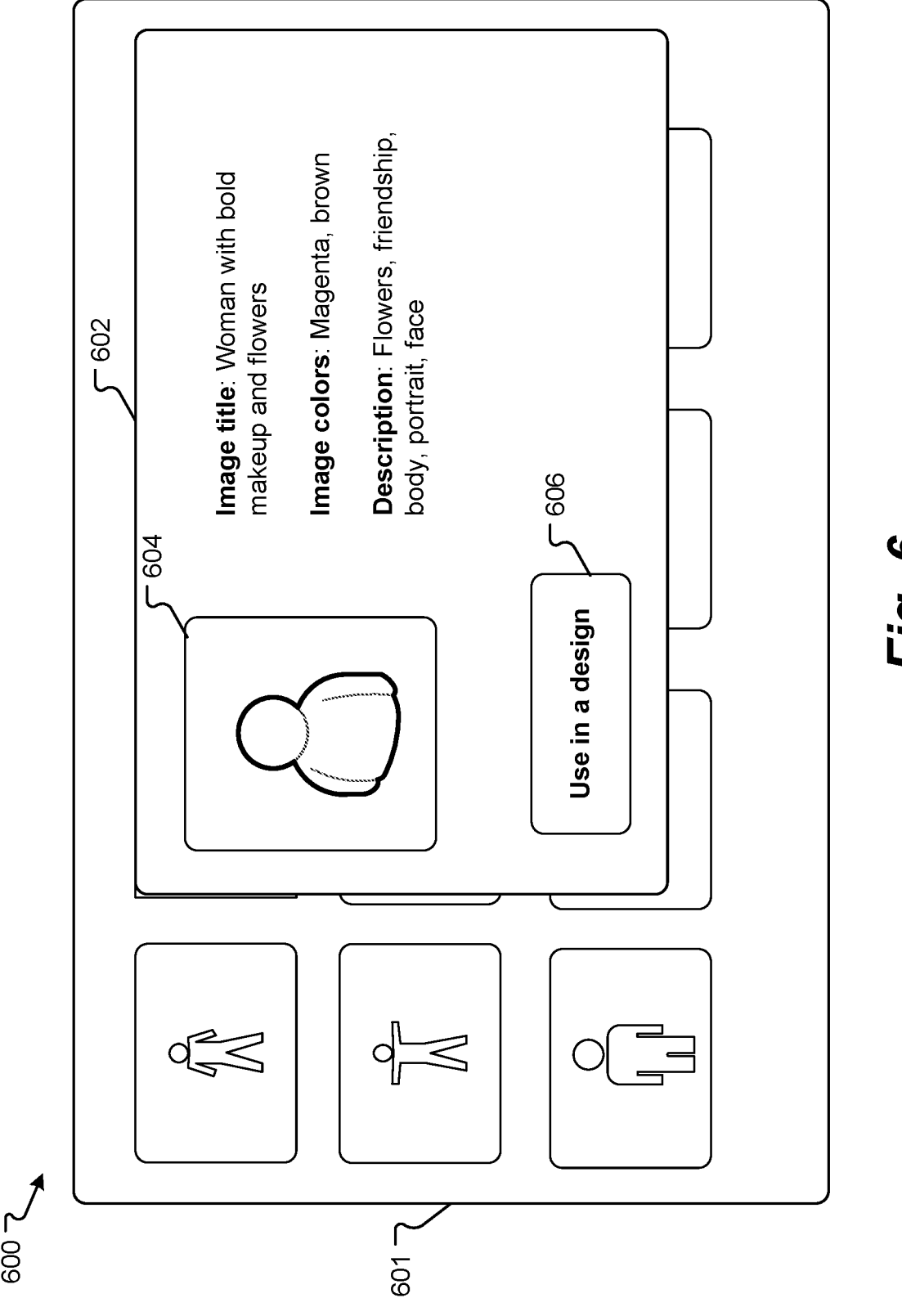
FIG. 6 depicts an example graphical user interface for triggering the method of FIG. 5.

Various methods and processes for identifying design template(s) matching an input image will now be described. In particular, FIG. 3 illustrates an example process for creating usage metrics, whereas FIGS. 4 and 6 illustrate example processes for creating image descriptors and matching design templates to input images, respectively.

Figure 3:
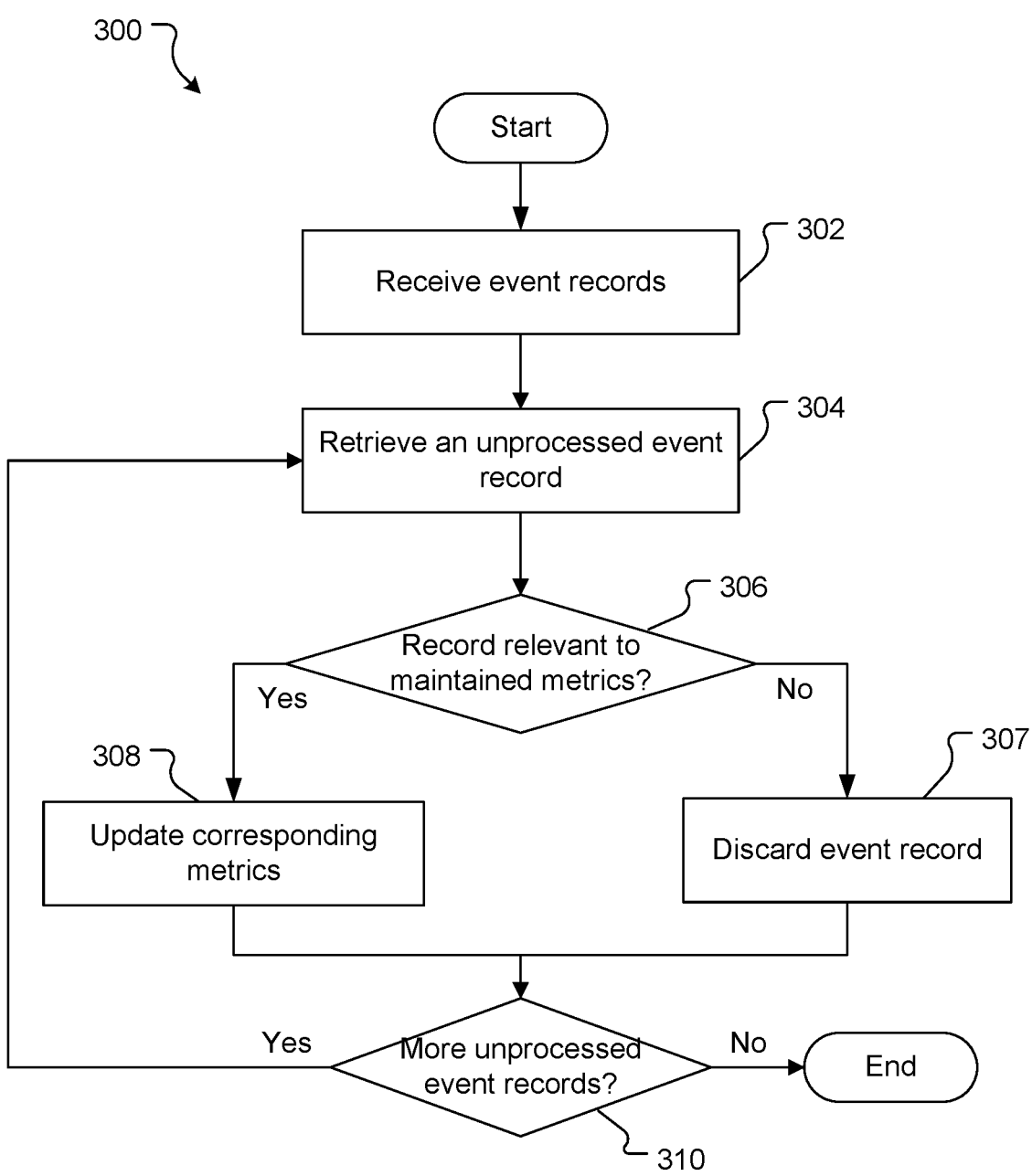
FIG. 3 is a flowchart depicting an example method for creating usage metrics.
Figure 4:
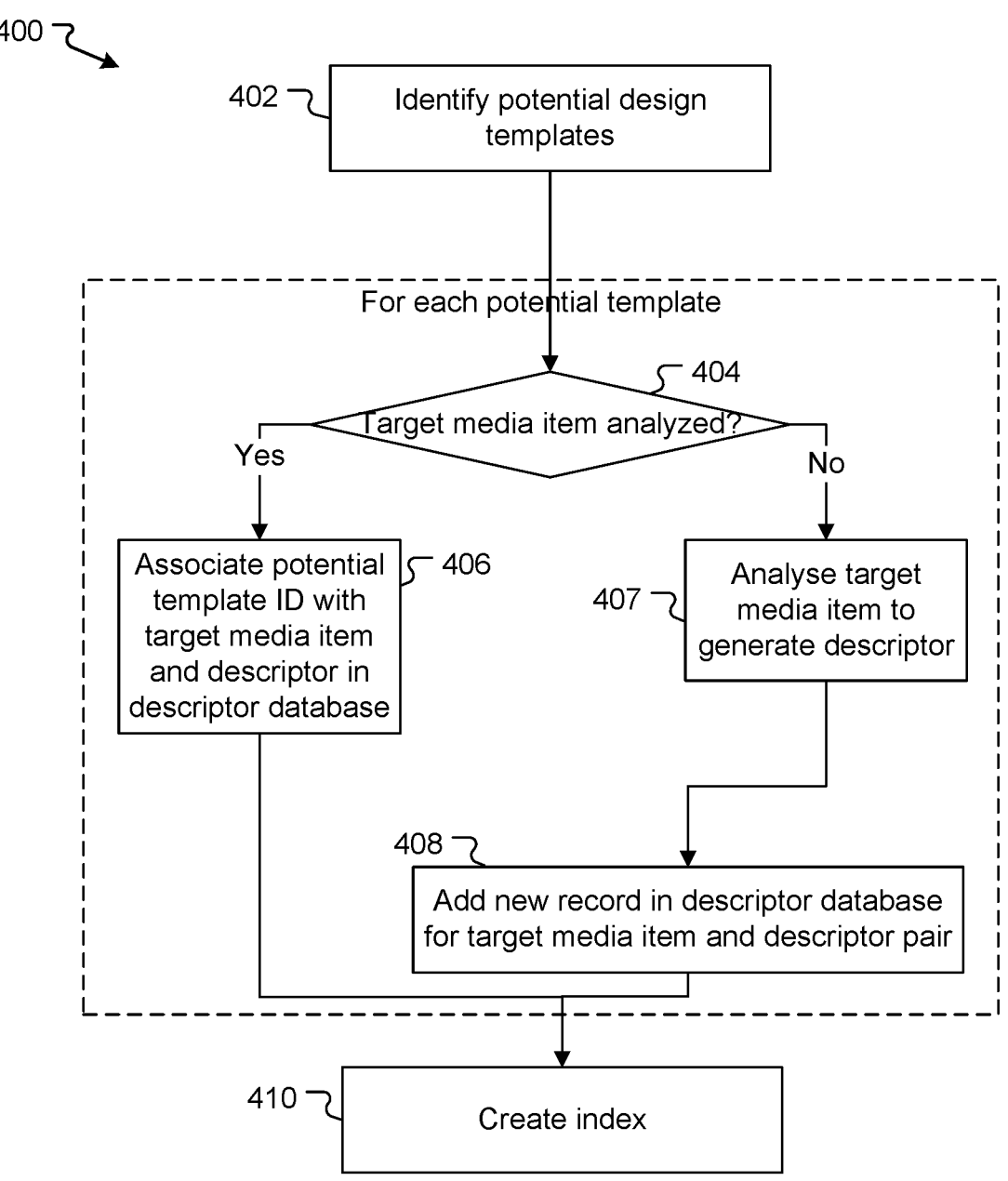
FIG. 4 is a flowchart depicting an example method for generating media descriptors according to some aspects of the present disclosure.

FIG. 3 illustrates an example method 300 for creating usage metrics. Although method 300 is described with reference to a single calculation process for a single metric, it will be appreciated that in practice this method is repeated periodically to calculate the various usage metrics (e.g., metrics shown in tables D and E) maintained by the metrics module 122 in a given period.

The periodicity of method 300 depends on the manner in which the metrics module 122 is configured. For example, in some cases the metrics module 122 may be configured to update usage metrics hourly and in other cases the metrics module 122 may be configured to update the usage metrics daily. The selected recomputing frequency may depend on a number of factors such as computation power required for the computing, the available computation power of the metrics module 122, etc. In other examples, instead of updating existing metrics, the design application 114 may recreate the usage metrics periodically and/or when metrics are required.

Users (on their client systems 130) interact with the design templates maintained by the digital design platform 100. When a user account interacts with a design template, an event is generated. As referred to herein, an event is an interaction between a user account and content hosted by the server environment 110. Examples of events include, without limitation: viewing design templates, selecting a design template, editing a design template, saving a design template as a new design, liking, or sharing a design template, etc. This list of example events is non-exhaustive and any other type of interactions with server hosted content can also be considered within the scope of the term "event".

When an event is detected, the design application 114 may generate information in respect of the event (in the form of an event record) and store this event record in the data storage 128. The event record may include, for example, a content type of the content a user interacted with. Content types may include design templates, videos, images, customized designs, etc. The event record may further include an identifier of the content the user interacted with, e.g., a design template ID, a design page ID, or a media item ID of the content the user interacted with. In addition, the event record may include a timestamp indicating the date/time the event occurred, and an event type indicator that indicates the type of activity the user was performing when the event occurred. Examples include, e.g., viewing content such as a design template, an image, or a page; selecting content, editing content, liking content, etc.

The method begins at step 302, where event records corresponding to a particular time window W (e.g., last hour, last 6 hours, last day, etc.) are received at the matching application 118 and particularly at the metrics module 122. In certain embodiments, based on a current time T, the metrics module 122 retrieves events that occurred between the period T-W.

In certain embodiments, the event recoding application 120) pushes event records to the metrics module 122 either in real time (i.e., whenever an event occurs) or at predetermined intervals (e.g., 15 minutes intervals, hourly intervals, etc.). In case event records are pushed at predetermined intervals, the metrics module 122 receives a batch of event records for events that were generated during that interval and stores these event records until it is time to compute the metrics.

In other embodiments, the metrics module 122 may pull event records from the event recording application 120 in real time (e.g., by utilizing webhooks that notify the metrics module 122 when events occur or are available at the event recording application 120) or by requesting the event platform at predetermined intervals (e.g., 1 minute intervals, 5 minute intervals, etc.) to provide event records that were generated in that interval. The metrics module 122 stores these event records until it is time to compute the metrics.

In some embodiments, the metrics module 122 may request the event recording application to provide event records related to design templates. The event recording application 120 may do so, in one example, by performing a search for "design template" in the content type field of the event records.

In any case, for the received event records, the metrics module 122 receives relevant data in respect of the event which may, depending on the implementation, include metadata and/or content. In one example, the event record may include the data fields described previously.

At step 304, an unprocessed event record from the set of event records for that time window is selected.

At step 306, the metrics module determines whether the event record is relevant to the maintained usage metrics. For example, if the metrics module 122 maintains design template usage metrics (shown in table D) and media item replacement metrics (shown in table E), an event record corresponding to selection of a media item that is not associated with any design template may not be a relevant event record. On the other hand, an event record corresponding to selection or saving of a design template may be a relevant event record. In one example, the metrics module 122 may determine whether an event record is relevant based on the usage metrics maintained by the metric module 122 and the event type field of the event record.

At step 306, if the metrics module 122 determines that an event record is not relevant, the event record may be discarded, and the method proceeds to step 310. Alternatively, if the metrics module 122 determines that the event record is relevant, the method proceeds to step 308 where the metrics module 122 updates one or more usage metrics based on the event record. For instance, if the event record corresponds to selection of a design template, the metrics module 122 may update the design template usage metrics (table D) described above. Alternatively, if the event record corresponds to replacement of a media item in a design template, the metrics module 122 may update the media item replacement metrics (table E) described above.

When updating a usage metric, if the metrics module 122 determines that a record already exists in the usage metric table or data structure, it updates the count of the corresponding usage record. For example, when updating the design template usage metrics (e.g., table D), if the metric module 122 determines that a record exists for the design template ID of the event record in the usage metrics, it updates the count for that existing record by one. Alternatively, if the metric module 122 determines that a record does not already exist in the corresponding usage metric or data structure, it adds a new record to the table or database with a count of 1. For example, when updating the media item replacement metric, if the metrics module 122 determines that a record does not exist for the media item identifier in the metrics database/table, it adds a new record for the media item identifier, the corresponding design template identifier, and adds a count of 1 for the record.

At step 310, the metrics module 122 determines whether any unprocessed event records exist in the event records retrieved at step 302. If it is determined that one or more unprocessed event records exist, the method returns to step 304. Alternatively, if a determination is made that no unprocessed event records remain, the method 300 ends.

Accordingly, using method 300, the metrics module 122 creates and maintains one or more databases of usage metrics data. These databases are updated periodically based on the selected re-computation frequency. Furthermore, information stored in these databases may be subsequently analysed to select matching design templates. These functions will be described in detail in the following sections.

When the usage metrics are computed on the fly when required, the method steps may be slightly modified. For example, at step 302, the matching application 118 may retrieve all design template related events for a particular period (e.g., last six months). It may then perform steps 304-312 until all retrieved event records are processed and the usage metrics is created and stored.

FIG. 4 illustrates an example method 400 for determining media item descriptors. It will be appreciated that this method is merely exemplary and that media item descriptors may be determined or generated using any other processes without departing from the scope of the present disclosure.

The method commences at step 402, where potential design templates are identified. This is the set of design templates that are considered in response to a design template request. The set of potential design templates can be selected based on any condition or criteria. In certain embodiments, the entire collection of design templates available at the server environment 110 may be considered the set of potential design templates. In other embodiments, to reduce the processing and searching load on the server environment, a subset of the entire universe of design templates available at the server environment 110 may be considered as the set of potential design templates. In one example, the universe of design templates can be reduced by considering design templates that include at least one media item (such as an image, video, or audio file) as the set of potential design templates and not including design templates that do not include media items. In another example, design templates that include a certain type of media asset (e.g., images) may be considered potential design templates and design templates that include other types of media items (e.g., audio or video) may not be added to the set of potential design templates. In yet another example, design templates that include a predetermined number of media items of a predetermined type may be considered potential templates (e.g., 1 image).

In one embodiment, potential design templates may be selected based on one or more usage metrics. For example, potential design templates may be selected based on design template popularity—i.e., design templates that have been selected, edited, and/or saved a threshold number of times in a predetermined time period may be identified as potential design templates. In another example, potential design templates may be selected based on the frequency of replacement of one or more media items in a design template—i.e., design templates in which one or more media items are frequently replaced (e.g., more than 70% of the time) may be identified as potential design templates.

In yet other embodiments, design templates may be identified as potential templates based on both the design template parameters and usage metrics described above. For example, a design template may be selected as a potential design template if it includes a predetermined number of media items of a predetermined type and at least one of the media items has been replaced a threshold number of times.

It will be appreciated that these are merely examples, and that any other criteria or combination of criteria may be utilized to reduce the universe of potential design templates without departing from the scope of the present disclosure.

In method 400, a design template is considered a potential design template if it includes at least one media item that is frequently replaced. The frequently replaced media item is referred to as a target media item.

In this embodiment, identification of potential design templates can be performed by analyzing the usage metrics. For example, from the universe of design templates maintained by the server environment 110, the matching application 118 may identify a first subset of design templates that includes design templates that have been used at least a threshold number of times. For example, it may identify design templates that have been used at least 100 times in a given period. To this end, the matching application 118 may inspect the design template usage data (e.g., in Table D) and identify a first subset of design templates that have selection, editing, saving, or total counts equal to or greater than the threshold number (e.g., 100).

From this first subset of design templates, the matching application 118 may identify a set of potential templates that includes design templates that have at least one media item that has been replaced at least a threshold percentage or number of times. To this end, the matching application 118 may inspect the media item replacement usage data (e.g., in Table E) and check the design template identifier field to find matches for any of the design templates in the first subset of design templates. If any matches are found, it may inspect the replacement count field, compute a percentage of replacement (based on the usage count and the replacement count), and determine whether the replacement percentage exceeds a threshold (e.g., 70%). If the matching application 118 determines that the media item replacement percentage exceeds the predetermined threshold (e.g., the design template includes a target media item that has been replaced 90% of the times the design template has been used), the design template is added to the set of potential design templates. Otherwise, it is not. In this manner, the matching application 118 performs a search for all the design templates in the first subset of design templates in table E and determines whether the design template should be added to the set of potential design templates or not.

This step of identifying potential design templates may be a continuous/periodic step. In some embodiments, the matching application 118 may perform a check for new design templates periodically. If any new design templates are added to the server environment 110, the matching application 118 may determine whether any of the new design templates should be added to the set of potential design templates. Similarly, the matching application 118 may perform a check to determine if any changes have been made to any design templates in a given period of time (e.g., since a previous check). If changes are identified, the matching application 118 may recheck whether the corresponding design template matches the selection conditions for the design template to be included in the set of potential design templates. If it does, the design template may be added to the set (if it wasn't already in the set of potential design templates). Otherwise, if it determines that the updated design template should not be included in the set of potential templates (e.g., because it does not match the selection conditions), the matching application 118 may remove the design template from the set of potential design templates (if it was previously added to the set).

Once potential design templates are identified, for each identified potential template, the method proceeds to step 404, where the media analyzer 124 retrieves the target media item associated with the potential design template and determines whether the target media item has already been analyzed. For this, the media analyzer 124 retrieves the identifier of the target media item and performs a lookup with this identifier in the media identifier field (e.g., in table F). If the media analyzer 124 identifies a match, it determines that the target media item has previously been analyzed (perhaps because the target media item was also used in another design template) and the method proceeds to step 406 where the media analyzer 124 updates the corresponding record (e.g., in table F) to include the design template identifier of the potential design template in the design template identifier field.

Alternatively, if a match is not found, the media analyzer 124 determines that the target image has not yet been analyzed and the method proceeds to step 407 where a descriptor is generated for the potential design template's target media item.

To this end, the media analyzer 124 retrieves the target media item (e.g., from data storage 128) and analyzes the content of the media item. In one example, the media analyzer 124 may utilize a machine learning model to analyze the media item and generate the descriptor. The type of machine learning model utilized may depend on the type of media item. For image type media items, a machine learning image encoder/embedder may be utilized that transforms images in the vector space and in particular into vectors of numbers often called "embeddings." Typically an image embedding is a vector representation of an image in which images with similar motifs, colors, shapes, etc., may have similar vector profiles. Generally speaking, each number in the embedding represents information of the image and the more the number of numbers in an embedding, the more the information about the image encoded into the embedding. In one example, each vector embedding may include 512 numbers. In other examples, fewer or more numbers may be included in the embedding. Image embedders of pre-trained neural networks such as contrastive language-image pretraining (CLIP), residual networks (RES-Net), vision transformer (ViT) or any other MIL model capable of converting images to descriptors may be utilized to obtain the image embeddings.

Similarly, for video type media items, a video classification machine learning model may be utilized that performs the task of identifying what a video represents. The media analyzer may convert the video into a series of frames or images and feed these to the video classification model. The video classification model may be configured to analyze each image or frame in the video to determine the content of the image/frame and also analyze the spatio-temporal relationship between adjacent frames to recognize the actions in a video (e.g., rising sun, setting sun, person doing pushups, etc.). In one example, the video classification model may also generate an embedding for the video that represents the actions being performed in the video.

For audio media items, the machine learning model may be configured to identify and classify what the audio represents. For example, the machine learning model may be configured to determine whether the audio is a song (and which song), is a noise (such as rain, clapping, birds chirping), or some other type of sound. The model may take audio waveforms as input and make predictions as to what the audio represents. In one example, the audio classification model may also generate an embedding for the audio item that represents what the audio item is. An example audio classification model may be VGGish, a deep learning model developed by Google® for audio feature extraction.

In any case, the machine learning model that is utilized to analyze the media item and generate the descriptor is trained such that it can represent a sufficient amount of relevant information about the media item in the descriptor. For instance, the image encoder machine learning model may be trained by feeding an appropriate amount (hundreds of thousands if not millions) of labelled images. The machine learning model is then trained to estimate the descriptor of an image based on the content of the image. During the training process, an image is fed to the model and based on the weights of the various layers of the model, a descriptor is generated. If the output is incorrect (i.e., it does not match the label of the image), the model changes the weights of one or more of its layers to be more likely to produce the correct output. This process is repeated numerous times with multiple images, until the model can correctly determine the descriptor of an image most of the times. It will be appreciated that the more the process is repeated, the more accurate the model becomes.

The video and audio classification models can be similarly trained by providing it copious amounts of labeled video and audio files, respectively. Training of machine learning models is fairly well known in the art and is not described in more detail here.

In the examples above, the descriptor is in the form of a vector embedding. In other examples, the descriptor may be in another form—e.g., it may be a natural language descriptor or a caption, such as 'pencil drawings of a sunset', 'a flock of birds flying at dusk', or 'an upbeat reggae tune'.

Once the media item descriptor is generated, it is associated with the target media item at step 408. In one example, the media analyzer 124 maintains a descriptor data structure as shown in table F and at step 408, the media analyzer 124 may create a new record in the data structure. The new record includes at least the identifier of the target media item, the identifier of the potential design template it is associated with, and the descriptor generated at step 406.

Steps 406-408 are repeated for all the potential design templates identified at step 402.

Next, at step 410, an index is generated based on the target image descriptors. This step is optional and may be performed to reduce the amount of time needed to identify matching target images in method 500 (described later). Generally speaking, the database shown in table F can be searched for K nearest neighbors using an exhaustive search—where the descriptor of a given target media item is compared with the descriptors of target media items in table F, or by grid trick—where the descriptor space is divided into grids. Both of these search techniques may be feasible if the size of table F is small as the query time for the first approach is linear and depends on the size of the dataset and for the second approach is exponential.

If table F is large and the descriptors have high dimensionality, both these techniques can become impractical and can result in high memory consumption and/or high latency.

To perform searches faster, the descriptors in table F can be encoded to construct an index for searches. Different indexing techniques may be utilized, such as approximate nearest neighbor trees, location-sensitive hashing, and quantization. When an approximate nearest neighbor tree based indexing technique is utilized, the descriptors (e.g., vector embeddings) of the target media items are split into many subsets, and a tree can be constructed using the many subsets. In particular, the vector space can be recursively split into subsets (each split representing a branch of a tree) until at most K embeddings are left in any subset.

In some other examples, instead of generating a single tree, multiple trees (also referred to as a forest) may be constructed, where each tree is constructed by using a random set of recursive splits. All the trees in the forest can be searched at the same time. Then the union of the results obtained from each tree can represent the approximate nearest neighbor embeddings to a given embedding in a very short span of time. As compared to the single tree approach, the forest approach improves the accuracy of search results. In one particular example, a Python nearest neighbor descent (PyNNDescent) library may be used for approximate nearest neighbor indexing.

If locality-sensitive hashing (LSH) is used to create the index, all the descriptors in table F are hashed using special locality-sensitive hash functions, such that "similar" descriptors are much more likely to collide or hash to the same bucket than dissimilar descriptors.

It will be appreciated that these are three examples of the way in which the descriptors can be indexed for faster retrieval. Many other indexing techniques are available and any such technique can be utilized without departing from the scope of the present disclosure. Further, the system may be configured to generate different indexes for different design template categories. This may further increase the query speed to retrieve similar descriptors, but may utilize more memory than a single index.

Further, in method 400, it is presumed that a single media item is a target media item in each design template. However, this need not be the case. Some design templates may have more than one media item that is replaced often. In such cases, such design templates may have more than one target media item and the media analyzer may analyze all such target media items according to steps 405-408 before proceeding to retrieve the next potential design template.

Further, the types of the target media items in such examples may be different. For example, one target media item may be an image and another target media item may be an audio file. In such cases, both target items may be analyzed using their respective machine learning models and descriptors for these target items may be stored in separate databases/table—one for image type media items and the other for audio type media items.

Method 400 is described with respect to one example where method 400 is performed periodically to update an existing descriptors database. In other examples, method 400 may be performed periodically not to update an existing descriptor database, but to recreate a descriptor database afresh. In this example, all previously identified potential design templates may be flushed from the database before a subsequent run of method 400 and the matching application 118 may determine a full list of potential design templates each time method 400 is executed. Further in such examples, method steps 404 and 406 may not be performed. Instead, for each potential template identified at step 402, a descriptor may be generated and stored in the database.

Figure 5:
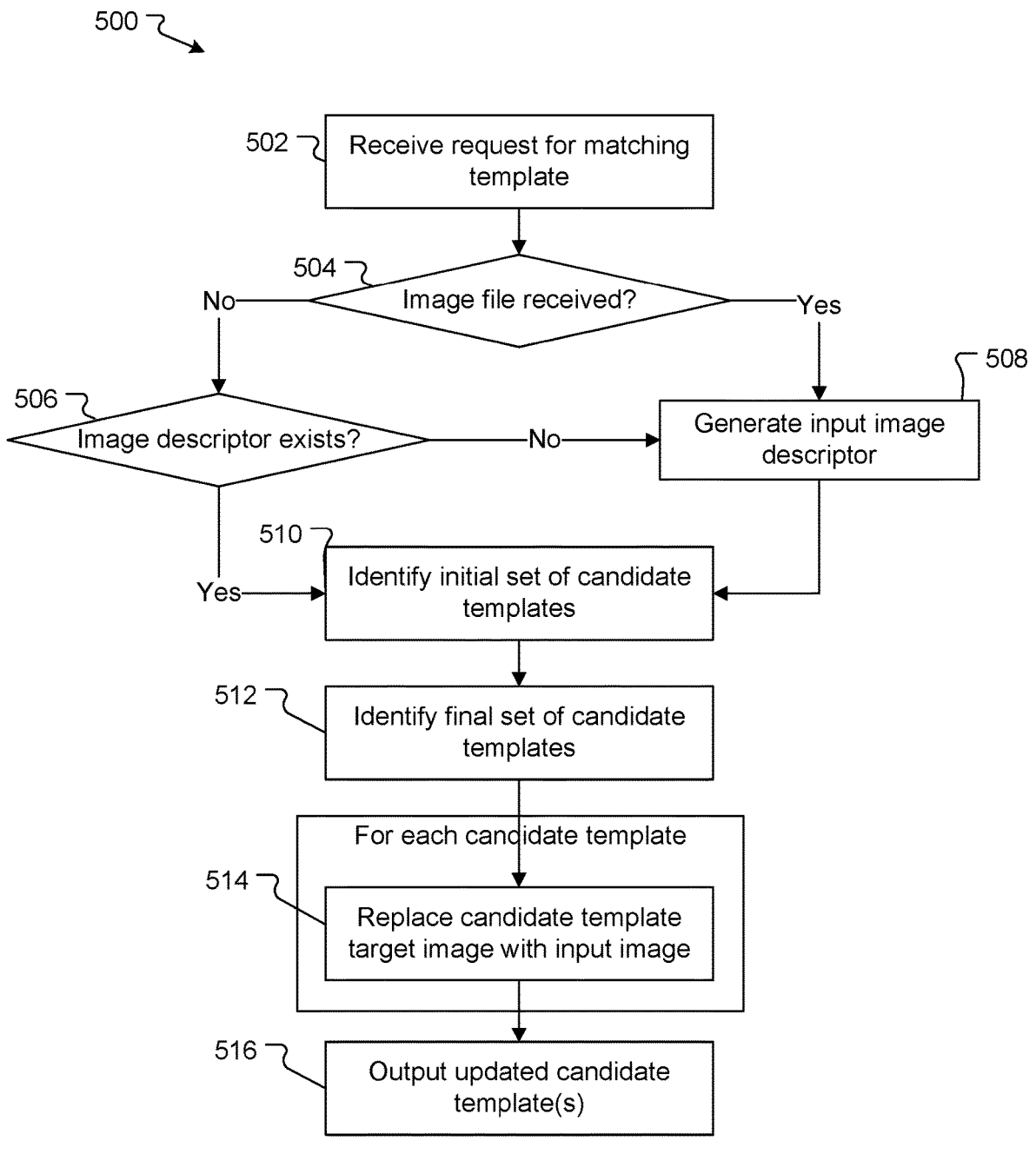
FIG. 5 is a flowchart depicting an example method for determining one or more design templates matching a media item according to some aspects of the present disclosure.

Turning to FIG. 5, a computer implemented method for determining one or more candidate design templates that match an input media item is described. The method 500 will be described with reference to a particular example media item type—an image. However, it will be appreciated that this is done simply for understandability of the process and that the process can be performed, albeit with slight modifications, for any other media type such as an audio or video file without departing from the scope of the present disclosure.

The method 500 commences at step 502 where the matching application 118 receives a request for matching design templates. The request may include an image file (if the input image has been uploaded by a customer using the client application 132) or a media identifier (if the input image has been selected from the media items managed by the digital design platform 100). The request may be generated by a client application 132 in response to a trigger action. For example, a user may be viewing a media item library managed by the digital design platform 100 on the client system 130 and may select a particular image from this library. Selection of the image may result in the client application 132 displaying one or more actions the user may be able to perform using the selected image. One action being—to use the selected image in a design or to find design templates in which the image can be used.

FIG. 6 illustrates an example user interface 600 displaying an image library 601 and a pop-up window 602 displayed upon selection of a particular image 604 in the image library. The pop-up window 602 includes the image, and some information about the image, such as image title, image metadata, or descriptor. The pop-up window 602 also includes a selectable control 606 'Use in a design'. Selection of this selectable control 606 may cause the client application 132 to generate the matching template request and communicate the request to the matching application 118.

In another example, a user may be viewing a homepage or some other user interface of the digital design application on the client system 130 and may wish to upload their own image to the digital design application. The user may select an 'upload' control on the displayed user interface and select an image file to upload to the design application. Once the image file has been selected and uploaded, the digital design application may display a user interface similar to that shown in FIG. 6. In particular, it may display a user interface similar to the pop-up window 602 of FIG. 6 that displays the uploaded image and controls for performing one or more actions with the uploaded image. One of the actions being to use the selected image in a design or to find a design template in which the image can be used.

Figure 7:
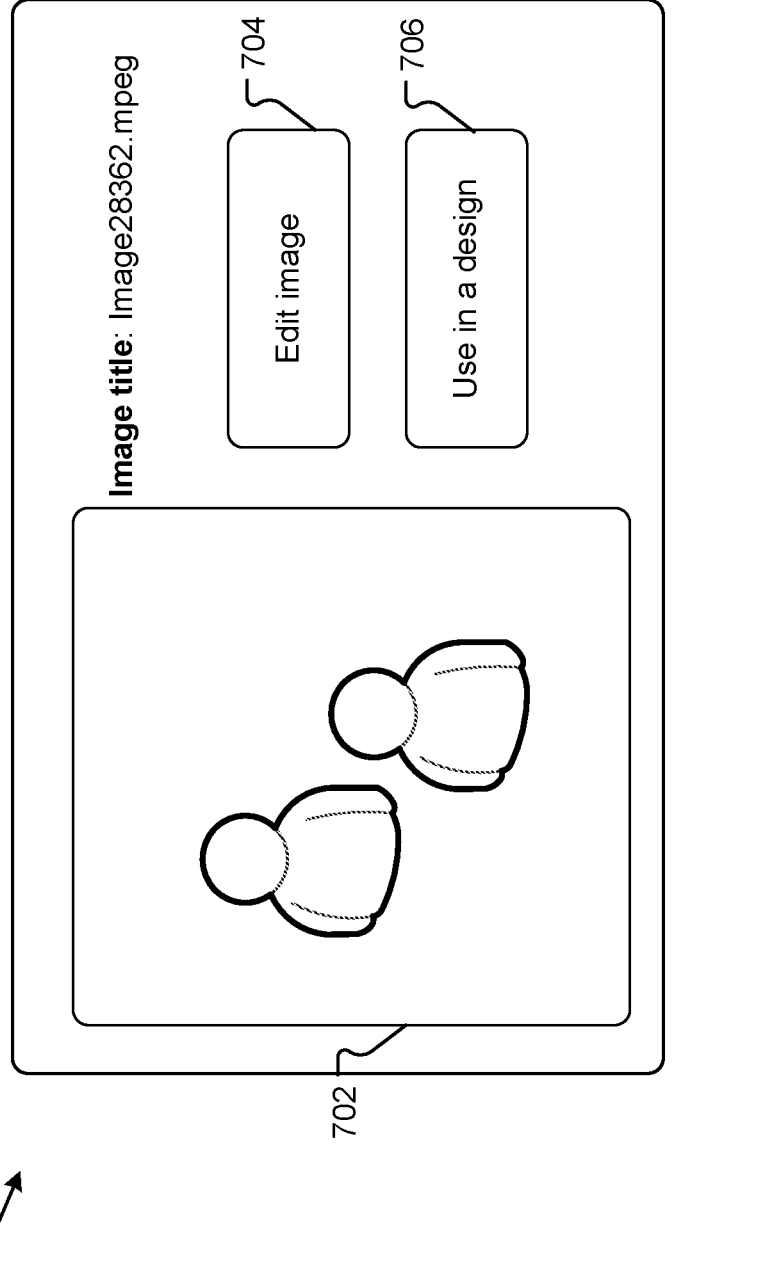
FIG. 7 depicts another example graphical user interface for triggering the method of FIG. 5.

FIG. 7 illustrates the example UI 700 displayed once an image has been uploaded. The UI 700 includes an element displaying the uploaded image 702, and image name. It also includes one or more selectable controls—two in this example—one control 704 allowing the user to edit the image and the other control 706 allowing the user to use the image in a design. Selection of control 706 results in the client application 132 generating a matching templates request and communicating it to the server environment 110.

In addition to the image identifier (in case control 606 is selected) or the image file (in case control 706 is selected), the client application 132 may include information about the user making the request (in case the user has an account with the digital design application 114) in the template matching request before communicating it to the matching application 118.

If the user selects an image from the media library managed by the digital design application, it may be possible that the media analyzer 124 has already analyzed the image and generated a descriptor for the media item in method 400. To avoid re-analyzing the image, at step 504, the matching application 118 may determine whether the matching template request includes an image file (uploaded by the user) or a media item identifier (of an image managed by the digital design application selected by the user).

If the matching template request includes a media item identifier of the input image, the method proceeds to step 506, where the matching application 118 determines whether a descriptor exists for the input image. In particular, the media analyzer 124 may perform a lookup with the image identifier of the input image in the descriptors database (e.g., table F). If a match is found, the media analyzer 124 determines that the input image has already been analyzed and a descriptor has already been generated. Alternatively, if a match is not found, the media analyzer 124 determines that the input image has not been analyzed and a descriptor does not exist for the image.

If a determination is made at step 506 that a descriptor does not exist for the input image, the method proceeds to step 508 where the media analyzer 124 retrieves the image content associated with the image identifier of the input image from the data storage 128 (in case of no path from step 506) or from the image file received in the template matching request (in case of yes path from step 504). The media analyzer 124 then analyzes the image content and generates a descriptor. This step is similar to step 407 of method 400 and therefore will not be described in detail again. The same machine learning model that is utilized in step 407 is utilized at step 508 to generate the image descriptor.

Once the descriptor is generated, the method proceeds to step 510 where the image descriptor is provided to the template finder 126 and the template finder 126 is configured to identify an initial set of candidate design templates. This step includes a number of sub-steps. First, the template finder 126 retrieves the image descriptor of the input image and performs a search with this descriptor in the media item descriptor database (e.g., table F) to identify an initial set of candidate descriptors that are similar to the descriptor of the input image. This may be done in various ways.

In one example, the template finder 126 may perform an exhaustive search in the descriptor database to identify K candidate descriptors that are similar to the descriptor of the input image. This may be done, for example, by comparing the descriptor of the input image with the each of the descriptors in the database and identifying descriptors that are the closest in terms of distance (e.g., Euclidean or Haversine distance) from the descriptor of the input image in a vector space.

In another example, if an index has been generated (e.g., at step 410), the template finder 126 may perform a search for the K approximate nearest neighbors for the descriptor of the input image in the index. In case the index is a tree index, to search for similar descriptors in the vector space to the descriptors of the input image, the template finder 126 can traverse the tree index from the root down to a particular branch. All the descriptors associated with the last branch in that traverse path can be selected as initial candidate descriptors.

In case the index is formed of a forest of multiple trees, the template finder 126 can traverse each of the trees in the forest simultaneously from the root down to a particular branch based on the descriptor of the input image. It can then perform a union of all the descriptors associated with the last branches of each of the trees it has traversed and select this union as the set of initial candidate descriptors.

In case the index is generated using LSH, the template finder 126 may hash the descriptors of the input image to a bucket as well. Other descriptors that hash to the same bucket are retrieved. The template finder 126 may then compute the actual similarity of these descriptors to the query, and select the most similar descriptors as the initial candidate descriptors.

It will be appreciated that in some cases, a threshold distance may be applied so that results which are below a certain similarity are not returned. In such cases, the template finder 126 may identify nearest neighbor descriptors that are a threshold distance away from the input image's descriptor. In such cases, the number of initial candidate descriptors returned by the template finder 126 may vary. In some cases, the system may return many candidate descriptors (in case the descriptor of the input image is in a crowded space) and in other cases the system may not return any candidate descriptors (in case the descriptors of the input image is in a sparsely populated section of the vector space).

Once one or more candidate descriptors are identified using any of the methods described above, the template finder 126 identifies the design templates that correspond to the identified candidate descriptors. To this end, the template finder 126 may query the descriptor database (e.g., table F) with the candidate descriptors to retrieve the corresponding image identifiers and design template identifiers.

Once the initial set of candidate design templates is determined, the method proceeds to step 512, where the initial set of candidate design templates is filtered to generate a final set of candidate templates. This step may be optional. In one example, the template finder 126 may filter the initial set of candidate templates based on a determination of whether the input image and target images are compatible. For example, it may compare the aspect ratio and/or image quality of the input image and each of the target images in the candidate design templates. This may be done, for example, by retrieving the media identifiers of each of the target images corresponding to the initial candidate design templates from table F and then performing a lookup with the media identifiers in the media asset records to retrieve corresponding media properties. These properties can then be compared with the properties of the input image to determine compatibility.

For example, if the aspect ratio of the input image is within a threshold value of the aspect ratio of a given target image, the design template(s) associated with that target image are included in the final candidate set. Alternatively, if the aspect ratio of the input image is not within a threshold value of the aspect ratio of a given target image, the design template(s) associated with that target image are not included in the final candidate set.

Next, at step 514, for each candidate design template in the final set of candidate design templates, the design module 127 replaces the template's target image with the input image. This may be done in various ways and may depend on the type of digital design application. In some cases, the identifiers of the candidate design templates may be communicated to the design module 127 along with an identifier or location of the input image. In case the input image is an image managed by the digital design application, the media identifier of the input image is provided to the design module 127. Alternatively, if the input image has been uploaded by the user, the matching application 118 may assign a temporary media identifier to the input image and store an image record of the input image with the other image records or store the media image in a temporary cache. In case a temporary media identifier and record is created for the input image, the temporary identifier is provided to the design module 127 at step 514. Otherwise, information about the location of the input image in the cache may be provided at this step.

The design module 127 utilizes this identifier or location information of the input image and replaces the media item identifier of the target image in each of the candidate design templates' element records (see table C) with the identifier or location information of the input image and saves the updated candidate template records (with the updated element records) as new temporary design records (e.g., in a cache).

When updating the element records, the design module 127 may manipulate the input image in some embodiments. For example, if the input image's size is smaller than the size of design element of a particular target image, the design module 127 may increase the size of the input image to match the size of the design element. Similarly, if the image size of the input image is larger than the size of the design element of a particular target image, the design module 127 may reduce the size of the input image (e.g., by cropping or shrinking) to match the size of the design element with which the target image was associated. In another example, if the input image has a different aspect ratio to the aspect ratio of the target image, the design module 127 may stretch or crop the input image such that its aspect ratio matches that of the target image before replacing the target image with the input image in the corresponding candidate design template.

At step 516, the matching application 118 outputs the updated candidate template(s). For example, the matching application 118 may communicate the updated candidate template(s) to the client application 132 that generated the template matching request at step 502. Alternatively, matching application 118 may save the updated candidate template (s) and may communicate a first updated candidate template to the client application 132 along with a number of available candidate templates.

In the first example, where the client application 132 receives all the updated candidate template(s), the client application 132 may display previews of the updated candidate templates in a user interface. In some cases, it may display a first x number of candidate templates on the screen and providing a scrolling control to view additional candidate templates that do not fit on the display screen. In other examples, it may display a subset of the updated candidate templates on the screen with controls to switch between previews of different candidate templates.

Figure 8:
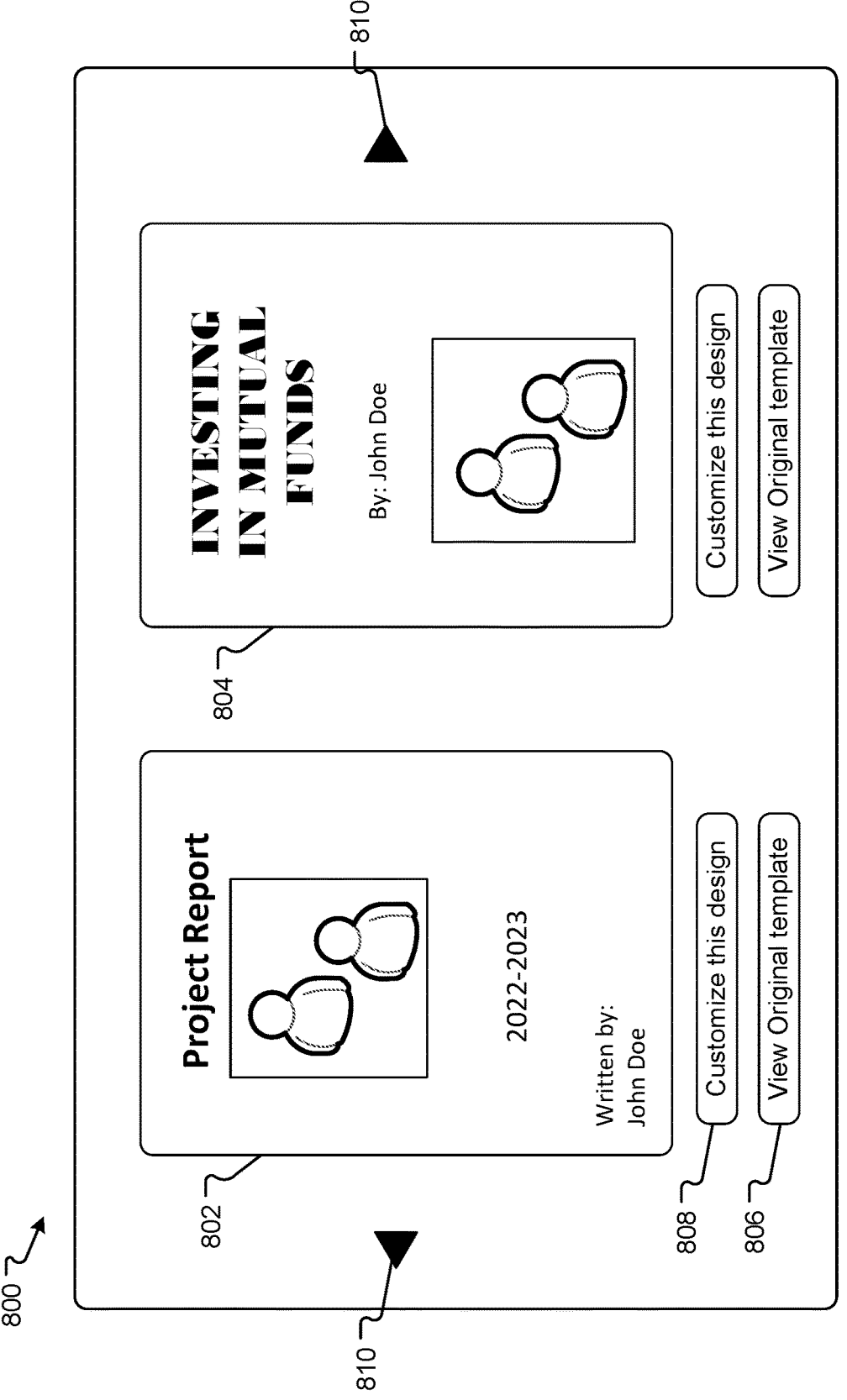
FIG. 8 depicts an example graphical user interface displaying design templates matching an input image.

FIG. 8 illustrates an example UI 800 displayed at step 516. In this case, the UI 800 displays two different candidate designs—802 and 804. In each of the designs, a target image in an original candidate design template has been replaced by the input image (e.g., input image 702). The UI 800 also provides a control 806 for each design allowing the user to view the original design template. If the user selects this control, the client application 132 generates and communicates a request for the original design template to the matching application 118. The matching application 118 retrieves the original design template or creates it based on the template, page, and element records and serves the original design template to the client application 132. The client application 132 can then display the original design template (either along with the updated design template or in place of the updated design template). In addition, the UI 800 includes a control 808 for each design to customize corresponding design. If the user selects this control, a new window or pop-up user interface may be displayed that allows the user to edit one or more design elements of the design. Finally, the UI 800 may include previous/next controls 810 that allow a user to view other candidate designs (if available).

In the second example, the client application 132 may display the first updated candidate template with the input image and may provide 'next'/'previous' controls to view any other available updated candidate templates. In this example, the design module 127 may generate the first updated candidate template initially and then generate other updated candidate templates when requested by the client application 132.

If the user selects any of the new designs displayed on the user interface and proceeds to customize the design, the digital design application 114 may store the updated design record for the design in association with the user account. The new temporary design records for the updated candidate design templates that were not selected by the user may be flushed from the cache.

In method 500, method steps 504 and 506 are performed so as to prevent the need to compute a descriptor for a media item for which a descriptor already exists. However, in some examples, computing a descriptor for a media item may not be process intensive. In such cases, method steps 504 and 506 may not be required. Instead, the method may directly proceed from step 502 to step 508, such that the matching application 118 generates a descriptor for any media item received in the matching template request, irrespective of whether it has previously generated a descriptor for that media item or not.

In case the input media item is selected from a library maintained by the design application 114, there may be a possibility that the matching application 118 selects the input media as one of the target media items at step 510. This may happen, e.g., because a design template that already uses the input image as a target image may be present in the potential design templates and this candidate design template may be selected as a candidate design template at step 510 because the descriptor of the that target image matches the descriptor of the input image (given they are the same image). To prevent such situations from arising, the template finder may perform a check using the identifier of the input image in the identifiers of the target images identified at step 510. If a match is found, the corresponding target image is discarded from the initial set of candidate target images.

Variations

In the method 500 described above, at least one candidate design template is updated based on the input image before it is communicated to the client application 132. In other embodiments, this may not be the case. Instead, the matching application 118 may simply determine a set of candidate design templates in which the input image can be used and communicate the identified unaltered candidate design templates to the client application 132. In such cases, the client application 132 may provide users with the option of viewing one or more of the candidate design templates with the input image. Upon receiving the user input, the client application 132 may communicate the identifier(s) of the selected candidate design template(s) to the matching application 118 and the matching application may then perform steps 514 and 516 for the selected candidate design templates.

Further, although in the embodiments described herein the user provides an input media item and the system automatically determines candidate design templates based on this input, this need not be the case in all implementations. In some cases, the user may provide further input to filter the candidate design templates. For example, the user may provide one or more design template parameters, such as design template category, color theme, etc., that can be used by the matching application 118 to determine the final set of candidate design templates at step 512. If the user selects a particular design category, the matching application 118 may filter the initial set of candidate templates (by inspecting the candidate template records) to remove any candidate design templates that do not belong to the selected design category. In another example, if the potential design templates are indexed based on categories, such that different indexes are created for different categories, the matching application 118 may perform step 510 on the index corresponding to the user selected design category. This way, the initial set of candidate templates may be filtered based on user input—further reducing the time required to determine candidate design templates.

In the methods 300-500 described above, where client application 132 operates to display controls, interfaces, or other objects, client application 132 does so via one or more displays that are connected to (or integral with) system 200—e.g. display 218. Where client application 132 operates to receive or detect user input, such input is provided via one or more input devices that are connected to (or integral with) system 200—e.g. a touch screen, a touch screen display 218, a cursor control device 224, a keyboard 226, and/or an alternative input device.

Further, in the above embodiments certain operations are described as being performed by the client system 130 (e.g. under control of the client application 132) and other operations are described as being performed at the server environment 110. Variations are, however, possible. For example in certain cases an operation described as being performed by client system 130 may be performed at the server environment 110 and, similarly, an operation described as being performed at the server environment 110 may be performed by the client system 130. Generally speaking, however, where user input is required such user input is initially received at client system 130 (by an input device thereof). Data representing that user input may be processed by one or more applications running on client system 130 or may be communicated to server environment 110 for one or more applications running on the computer processing hardware 112 to process. Similarly, data or information that is to be output by a client system 130 (e.g. via display, speaker, or other output device) ultimately involves that client system 130. The data/information that is output may, however, be generated (or based on data generated) by client application 132 and/or the server environment 110 (and communicated to the client system 130 to be output).

In the embodiments described above and the figures, various examples of how different types of GUI elements (and/or different GUI areas/regions) may be visually distinguished are provided. Alternative means for visually distinguishing GUI elements are possible. By way of example, techniques for visually distinguishing GUI elements may include one or a combination of: shading colors; shading patterns; line colors; line weights; line styles; transparencies; icons; character annotations; and/or other visual techniques.

In the present disclosure, processing is performed with respect to individual design pages. To this end, and unless stated otherwise, reference to a design herein is reference to a single page of a design. The techniques described herein may, however, be adapted to be applied to multi-page designs, for example by processing each page of a multi-page design separately.

Further, the present disclosure concerns replacing one or more graphic design elements in designs. As noted above, in some implementations a design may be able to have multiple pages. Where multi-page designs are possible, reference in the present disclosure to replacing an element in a design is (unless stated otherwise) to be understood as replacing an element in a particular page of a design. The particular page will, for example, typically be a page selected by a user—for example a page that has been selected and is displayed in a preview area of a UI displayed on a display 218 of the client system 130.

The flowcharts illustrated in the figures and described above define operations in particular orders to explain various features. In some cases the operations described and illustrated may be able to be performed in a different order to that shown/described, one or more operations may be combined into a single operation, a single operation may be divided into multiple separate operations, and/or the function(s) achieved by one or more of the described/illustrated operations may be achieved by one or more alternative operations. Still further, the functionality/processing of a given flowchart operation could potentially be performed by (or in conjunction with) different applications running on the same or different computer processing systems.

The present disclosure provides various user interface examples. It will be appreciated that alternative user interfaces are possible. Such alternative user interfaces may provide the same or similar user interface features to those described and/or illustrated in different ways, provide additional user interface features to those described and/or illustrated, or omit certain user interface features that have been described and/or illustrated.

Unless otherwise stated, the terms "include" and "comprise" (and variations thereof such as "including", "includes", "comprising", "comprises", "comprised" and the like) are used inclusively and do not exclude further features, components, integers, steps, or elements.

Although the present disclosure uses terms "first," "second," etc. to describe various elements, these terms are used to distinguish elements from one another and not in an ordinal sense. For example, a first candidate template could be termed a second candidate template or vice versa without departing from the scope of the described examples. Furthermore, when used to differentiate elements or features, a second candidate template could exist without a first candidate template. For example, a second user input could occur before a first user input (or without a first user input ever occurring).

It will be understood that the embodiments disclosed and defined in this specification extend to alternative combinations of two or more of the individual features mentioned in or evident from the text or drawings. All of these different combinations constitute alternative embodiments of the present disclosure.

The present specification describes various embodiments with reference to numerous specific details that may vary from implementation to implementation. No limitation, element, property, feature, advantage, or attribute that is not expressly recited in a claim should be considered as a required or essential feature. Accordingly, the specification and drawings are to be regarded in an illustrative rather than a restrictive sense.

The invention claimed is:

1. A method for automatically generating one or more digital designs, the method including:

identifying an input media item;

processing the input media item to generate an input media item descriptor;

identifying a first target media item from a set of target media items, wherein each target media items in the set of target media items is associated with a target media item descriptor and a candidate design template, and wherein the first target media item is identified based on a similarity between the input media item descriptor and the target media item descriptor of the first target media item;

selecting the candidate design template associated with the first target media item; and generating a new digital design, wherein:

the new digital design is based on the selected candidate design template; and the new digital design is generated to replace the first target media item in the selected candidate design template with the input media item.

2. The method of claim 1, wherein the set of target media items and the input media item is at least one of an image, a video, or an audio file.

3. The method of claim 2, wherein generating the input media item descriptor comprising:

analyzing the input media item using a machine learning model, and generating a vector embedding representing the input media item in a vector space or generating a natural language caption representing content of the media item.

4. The method of claim 3, wherein the machine learning model is a contrastive language-image pretraining (CLIP) model.

5. The method of claim 3, wherein identifying the first target media item from the set of target media items comprises:

determining a distance between the vector embedding of the input media item and the vector embeddings of the set of target media items; and identifying the first target media item from the set of target media items as the target media item that has a vector embedding nearest to the vector embedding of the input media item.

6. The method of claim 1, wherein the set of target media items is selected from a superset of media items based on a frequency with which a target media item is replaced from a design template.

7. A computer-implemented method for identifying one or more design templates matching an input media item, including:

receiving the input media item, the input media item selected by a user;

processing the input media item to generate an input media item descriptor;

identifying one or more target media items from a set of target media items, wherein each target media item in the set of target media items is associated with a target media item descriptor and is an existing media item of a candidate design template, and wherein the one or more target media items are identified based on a similarity between the input media item descriptor and the target media item descriptors of the one or more target media items;

identifying candidate design templates associated with the one or more identified target media items; and causing display of the identified candidate design templates on a display of a user device that selected the input media item.

8. The computer-implemented method of claim 7, further comprising generating one or more new digital designs, wherein each new digital design is based on a candidate design template of the candidate design templates associated with the one or more target media items, and wherein each new digital design is generated to replace the one or more target media items of the candidate design templates with the input media item.

9. The computer-implemented method of claim 7, wherein the set of target media items and the input media item is at least one of an image, a video, or an audio file.

10. The computer-implemented method of claim 7, further comprises generating media item descriptors for each media item in the set of target media items.

11. The computer-implemented method of claim 10, wherein generating the input media item descriptor or generating the media item descriptors for the set of media items comprising analyzing the input media item or each media item in the set of media items using a machine learning model, and the media item descriptors includes a vector embedding representing the input media item or each media item in the set of media items in a vector space.

12. The computer-implemented method of claim 11, wherein identifying the one or more target media items from the set of target media items comprises:

determining a distance between the vector embedding of the input media item and the vector embeddings of the set of target media items; and identifying the one or more target media items from the set of target media items as the one or more target media items that have a vector embedding within a threshold distance of the vector embedding of the input media item.

13. The computer-implemented method of claim 11, wherein identifying the one or more target media items from the set of target media items comprises:

determining a distance between the vector embedding of the input media item and the vector embeddings of the set of target media items; and identifying the one or more target media items from the set of target media items by selecting a maximum or minimum number of target media items that have a vector embeddings near the vector embedding of the input media item.

14. The computer-implemented method of claim 7, wherein the set of target media items is selected from a superset of media items based on a frequency with which a target media item is replaced from a design template.

15. The computer-implemented method of claim 10, further comprising generating an index based on the media item descriptors of the set of media items.

16. The computer-implemented method of claim 15, wherein identifying the one or more target media items from the set of target media items comprises performing a search in the index for the one or more target media items that have descriptors that are the most similar to the descriptor of the input media item.

17. A non-transitory computer readable medium comprising instructions, which when executed by a processing unit of a computer processing system, cause the computer processing system to:

identify an input media item;

process the input media item to generate an input media item descriptor;

identify a first target media item from a set of target media items, wherein each target media items in the set of target media items is associated with a target media item descriptor and a candidate design template, and wherein the first target media item is identified based on a similarity between the input media item descriptor and the target media item descriptor of the first target media item;

select the candidate design template associated with the first target media item; and generate a new digital design, wherein:

the new digital design is based on the selected candidate design template; and the new digital design is generated to replace the first target media item in the selected candidate design template with the input media item.

18. The non-transitory computer readable medium of claim 17, wherein generating the input media item descriptor comprising analyzing the input media item using a machine learning model, and the input media item descriptor includes a vector embedding representing the input media item in a vector space or a natural language caption representing content of the input media item.

19. The non-transitory computer readable medium of claim 18, wherein identifying the first target media item from the set of target media items comprises:

determining a distance between the vector embedding of the input media item and the vector embeddings of the set of target media items and identifying the first target media item from the set of target media items as the media item that has a vector embedding nearest to the vector embedding of the input media item.

20. The non-transitory computer readable medium of claim 17, wherein the set of target media items is selected from a superset of media items based on a frequency with which a target media item is replaced from a design template.

* * * * *